US008822592B2

(12) United States Patent
Kok et al.

(10) Patent No.: US 8,822,592 B2
(45) Date of Patent: Sep. 2, 2014

(54) AQUEOUS EMULSION POLYMER AS DISPERSANT

(75) Inventors: Harm-Jan Kok, Heerenveen (NL); Marleen Suurmeijer, Joure (NL)

(73) Assignee: BASF SE, Ludwigshafen (DE)

( * ) Notice: Subject to any disclaimer, the term of this patent is extended or adjusted under 35 U.S.C. 154(b) by 2326 days.

(21) Appl. No.: 10/533,573

(22) PCT Filed: Nov. 11, 2003

(86) PCT No.: PCT/EP03/12582
§ 371 (c)(1),
(2), (4) Date: May 22, 2009

(87) PCT Pub. No.: WO2004/045755
PCT Pub. Date: Jun. 3, 2004

(65) Prior Publication Data
US 2009/0234062 A1  Sep. 17, 2009

(30) Foreign Application Priority Data

Nov. 20, 2002 (EP) .................................. 02406000

(51) Int. Cl.
| C08L 39/00 | (2006.01) |
| C08L 39/08 | (2006.01) |
| C08F 220/12 | (2006.01) |
| C08F 220/26 | (2006.01) |
| C08F 220/34 | (2006.01) |
| C08F 212/08 | (2006.01) |

(52) U.S. Cl.
USPC ............ 524/556; 524/555; 524/577; 526/263; 526/310; 526/299; 526/307.5

(58) Field of Classification Search
USPC ......... 526/263, 310, 299, 307.5; 524/548, 55, 524/577
See application file for complete search history.

(56) References Cited

U.S. PATENT DOCUMENTS

| 3,637,563 | A | * | 1/1972 | Christena ...................... 523/305 |
| 5,508,313 | A | * | 4/1996 | Delgado et al. ................. 521/63 |
| 5,851,662 | A | * | 12/1998 | Suzuki et al. ................. 428/352 |
| 6,994,745 | B2 | * | 2/2006 | Hoshida et al. ............ 106/31.85 |
| 7,026,392 | B2 | * | 4/2006 | Nakajima et al. ............. 524/555 |
| 2002/0132890 | A1 | | 9/2002 | Ramesh et al. ............... 524/236 |

FOREIGN PATENT DOCUMENTS

| GB | 1057723 | 2/1967 |
| WO | WO 0231010 A1 * | 4/2002 |
| WO | 02/057004 | 7/2002 |

OTHER PUBLICATIONS

Patent Abstracts of Japan Publication No. 55054372 (1980).
Patent Abstracts of Japan Publication No. 06287246 (1993).
Patent Abstracts of Japan Publication No. 60137917 (1985).

* cited by examiner

*Primary Examiner* — Satya Sastri
(74) *Attorney, Agent, or Firm* — Shruti Costales

(57) ABSTRACT

This invention relates to an aqueous emulsion polymer used as pigment dispersing agent comprising as copolymerized units the following monomers (A) an ethylenically unsaturated monomer containing at least one amino group; (B) an ethylenically unsaturated monomer containing no amino group; (C) optionally a hydroxy- or alkoxyalkyl(meth)acrylate of the formula $CH_2=CH(R^1)-COO-C_tH_{2t}-OR^2$ wherein $R^1$ is hydrogen or methyl and $R^2$ is hydrogen or $C_1$-$C_6$alkyl and t is an integer of 2, 3, 4, 5 or 6; (D) a (poly)alkyleneglycolmono(meth)acrylate of the formula $CH_2=CH(R^1)-COO-(C_mH_{2m}O)_n-OR^2$ wherein $R^1$ is hydrogen or methyl and $R^2$ is hydrogen or $C_1$-$C_6$alkyl and m is an integer of 2 or 3 and n is an integer of 2 to 20.

15 Claims, No Drawings

AQUEOUS EMULSION POLYMER AS DISPERSANT

This invention relates to a water-borne emulsion polymer suitable as pigment dispersing agent.

To introduce solid substances, such as pigments, into liquid media, high mechanical forces are necessary. This depends to a large extent on the solid substance's wet ability by the surrounding medium, as well as on the affinity for this medium. In order to reduce these dispersing forces, it is conventional to use dispersing agents, which facilitate incorporating the substances. This mostly concerns surface-active agents or surfactants, of anionic or cationic or non-ionic structure. In relatively low amounts of addition, these agents are either applied directly to the solid substance or added to the dispersing medium. Through such a surfactant, the energy required for the dispersion is considerably reduced.

Further, it is known that such solid substances, after dispersion, tend to reagglomerate, which nullifies the initially induced dispersing energy and leads to serious problems. This phenomenon can be explained by inter alia London/van der Waals' forces, by which the solid substances are mutually attracted. In order to nullify these attractive forces, adsorption layers should be provided on the solid substances. This occurs through the use of such surfactants or polymers.

During and after the dispersion, however, there arises an interaction of the surrounding medium with the solid particle, so that a desorption of the surfactant can arise in exchange for the surrounding medium present in a higher concentration. However, in most cases this surrounding medium is incapable of building up such stable adsorption layers, so that the entire system flocculates. This is evidenced by inter alia an increase of the viscosity in liquid systems, loss of gloss, color shifts in paints and coatings, insufficient development of coloring power in pigmented plastics and lacquers, as well as a decrease of the mechanical strength in reinforced plastics.

The International publication WO02/057004 (EFKA Additives B.V.) describes a new range of dispersants based on the use of dendrimers as core material for the dispersing agent. This results in a very specific three-dimensional structure with advantageous dispersing properties. The dispersing agent comprises at least one dendrimer, said dendrimer comprising functional groups, that have reacted with a functional moiety, said moiety being defined as —R—X, X being a pigment affinic group, and R being a linking moiety chain having at least 2 atoms in the chain, with the proviso that the functional group and the pigment affinic group are different.

United States Patent Publication 2002/0132890 describes water-based acrylic emulsion dispersants for an inorganic pigment. The acrylic emulsion dispersant is the reaction product of butyl methacrylate, butyl acrylate, styrene, methyl ether polyethylene glycol methacrylate, polyethylene glycol methacrylate, and polyphosphoric acid. Thus, an acid anchoring group is present which interacts with metal centers that are inherent in inorganic pigments to stabilize the pigment or the pigments in the pigment dispersion.

It is an object of the present invention to provide a water-borne emulsion polymer in a solvent free environment having improved dispersing properties for organic and inorganic pigments in water based polymer/coatings.

The dispersants of the state of the art are soluble in the medium of the dispersion, e.g. in water. Surprisingly it has been found that a water insoluble system (emulsion) can be used as a dispersant in aqueous systems.

Thus, the invention relates to a water-borne emulsion polymer comprising as co-polymerized units the following monomers:

(A) an ethylenically unsaturated monomer containing at least one amino group;
(B) an ethylenically unsaturated monomer containing no amino group;
(C) optionally a hydroxy- or alkoxyalkyl(meth)acrylate of the formula

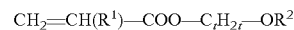

wherein $R^1$ is hydrogen or methyl and $R^2$ is hydrogen or $C_1$-$C_6$alkyl and t is an integer of 2, 3, 4, 5 or 6;
(D) a (poly)alkyleneglycolmono(meth)acrylate of the formula

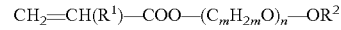

wherein $R^1$ is hydrogen or methyl and $R^2$ is hydrogen or $C_1$-$C_6$alkyl and m is an integer of 2 or 3 and n is an integer of 2 to 30.

Compound (A) is present in an amount of 0.1-30 wt % based on the total amount of monomers used.
Compound (B) Is present in an amount of 0.1-30 wt % based on the total amount of monomers used.
Compound (C) is present in an amount of 0-50 wt % based on the total amount of monomers used.
Compound (D) is present in an amount of 0.1-50 wt % based on the total amount of monomers used.
The total numbers of monomer is 100 weight %.
In a preferred embodiment compound (C) is present.

Definitions

The term "water-borne emulsion polymer" refers to a polymer, which is produced by the so-called emulsion (heterogeneous) polymerization process. The polymerization takes place directly in the water phase instead of in solvents or carriers. Thus, the medium is water or a mixture of water and a water soluble/miscible organic solvent.

A polymer according to the invention or a polymer used in accordance to the invention has a number average molecular weight in the range of 1,000 to 50,000 g/mol, preferably in the range of 2,000 to 20,000 g/mol.

A suitable delivery form is, for example, 40-45% of solid polymer in water.

Non-limiting examples for ethylenically unsaturated monomers containing at least one amino group (Group A) are:

Amino(meth)acrylates such as N,N-dimethylaminomethyl (meth)acrylate, N,N-dimethylamino-ethyl (meth)acrylate, N,N-diethylaminoethyl (meth)acrylate;

Amino (meth)acrylamides such as N,N-dimethylaminoethyl (meth)acrylamide, N,N-diethyl-aminoethyl (meth)acrylamide, N,N-dimethylaminopropyl (meth)acrylamide, N-methylol (meth)acrylamide; (meth)acrylonitril;

Heterocyclic vinyl compounds such as 2-vinylpyridine, 3-vinylpyridine, 4-vinylpyridine, 2-methyl-5-vinylpyridine, 3-ethyl-4-vinylpyridine, 2,3-dimethyl-5-vinylpyridine; N-vinylpyrimidine, N-vinylpiperidine, 2-vinylpiperidine, 4-vinylpiperidine, N-vinylpiperazine, N-vinylpiperidone, 9-vinylcarbazole, 3-vinylcarbazole, 4-vinylcarbazole, 1-vinylimidazole, 2-methyl-1-vinylimidazole, N-vinylpyrrole, N-vinylpyrazole, N-vinylpyrrolidone, 2-vinylpyrrolidone, N-vinylpyrrolidine, 3-vinylpyrrolidine, N-vinylmorpholine, N-vinyloxolane, N-vinylfuran, N-vinylthiophene, N-vinylthiolane, N-vinyl-1,2,3-triazole, N-vinyl-1,2,4-triazole, N-vinyl-1,3,4-triazole and hydrogenated vinylthiazoles, vinyl-oxazoles and hydrogenated vinyloxazoles.

Preferred are amino (meth)acrylates and heterocyclic vinyl compounds, especially vinylpyridines and vinylimidazoles.

Non-limiting examples of suitable ethylenically unsaturated monomers containing no amino group (Group B) are:

Alkyl vinyl ethers, such as methyl vinyl ether, isopropyl vinyl ether, isobutyl vinyl ether, vinyl 2-methoxy ethyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methyl-heptyl vinyl ether, n-decyl vinyl ether, n-tetradecyl vinyl ether, and n-octadecyl vinyl ether;

Gamma substituted ethers, such as -methylvinyl methyl ether, alpha-methylvinyl ethyl ether, alpha-amylvinyl methyl ether, and alpha-phenylvinyl ethyl ether;

Alicyclic and aralkyl vinyl ethers, such as cyclohexanol vinyl ether, menthol vinyl ether, carvacrol (=5-isopropyl-2-methylphenol) vinyl ether, benzyl alcohol vinyl ether, beta-phenyl-ethanol vinyl ether, tetrahydronaphthol vinyl ether, beta-decahydronaphthol vinyl ether, methylphenyl carbinol vinyl ether and butyl-cyclohexanol vinyl ether;

Vinyl aryl ethers, such as vinyl phenyl ether, alpha-bromovinyl phenyl ether, alpha-phenylvinyl phenyl ether, vinyl m-cresyl ether, alpha-methyl vinyl p-cresyl ether, vinyl p-chlorophenyl ether, vinyl 2,4,6-trichlorophenyl ether, and vinyl alpha-naphthyl ether;

Vinyl esters of linear or branched carboxylic acids, such as vinyl acetate, vinyl methoxy-acetate, vinyl trimethylacetate, vinyl isobutyrate, isopropenyl butyrate, vinyl lactate, vinylcaprylate, vinyl myristate, vinyl oleate, and vinyl linoleate;

Vinyl esters of aromatic acids, such as vinyl benzoate, vinyl alkoxybenzoates, vinyl octyl-phthalate, vinyl tetrachlorobenzoate, vinyl beta-phenyl butyrate, vinyl beta-naphthoate, and vinyl ethyl phthalate;

Vinyl formate and vinyl carbonate derivatives, such as vinyl formate, vinyl chloroformate, methylvinyl chloroformate, vinyl methyl carbonate, vinyl ethyl carbonate, vinyl phenyl-carbonate and vinylidenecarbonate;

Vinyl thioesters, such a vinyl methyl sulphide, vinyl n-butyl sulphide, 1-chloroethyl vinyl sulphide, 2-chloroethyl vinyl sulphide, vinyl dodecyl sulphide, vinyl phenyl sulphide, vinyl o-cresyl sulphide, vinyl 2,5-dimethyl-4-chlorophenyl sulphide, vinyl 8-chloronaphthyl sulphide, and vinyl 2-benzothiazylsulphide.

Styrene and related monomers, such as styrene, o-methylstyrene, p-methylstyrene, 3,4-di-methyl styrene, 2,4,6-trimethyl styrene, m-ethyl styrene, 2,5-diethyl styrene, p-butyl styrene, m-t-butyl styrene, p-benzyl styrene, o-methoxy styrene, p-methoxystyrene, 6-methoxy-3-methyl styrene, 2,6-dimethoxy styrene, and 2-methoxy-5-isopropyl styrene;

Derivatives of -methyl styrene, such as 4-chloro-methyl styrene, 3,4-dimethyl-methyl-styrene, 3-bromo-2-methyl-methylstyrene, and 2,5-dichloro-alpha-methylstyrene;

Chlorostyrene derivatives, such as m-chlorostyrene, 2,3-dichlorostyrene, 3,4-dichlorostyrene, trichlorostyrene, and pentachlorostyrene;

Bromo- and fluorostyrene derivatives, such as p-bromostyrene, m-fluorostyrene, m-tri-fluoromethyl styrene, 4-fluoro-3-trifluoromethyl styrene, and pentafluorostyrene;

Other styrene derivatives, such as p-formyl styrene, methyl ester of p-vinyl benzoic acid, p-vinylbenzyl alcohol, 1,4-dimethyl-2-hydroxystyrene, 3,5-dibromo-4-hydroxystyrene, 2-nitro-4-isopropylstyrene;

Vinyl derivatives of biphenyl, naphthalene and related aromatic compounds, such as 4-chloro-4'-vinyl biphenyl, o-isopropenyl biphenyl, p-vinyl diphenyl oxide, 4-chloro-1-vinyl naphthalene, 1-chloro-4-vinyl naphthalene, and 1-vinyl acinaphthalene;

Vinylfuran, vinylbenzofuran, vinylthiophene, such as 2-vinyl dibenzofuran, 5-ethyl-2-vinyl-thiophene, 5-chloro-2-vinyl thiophene, 3,4,5-trichloro-2-vinyl thiophene and 2-vinyl dibenzo-thiophene;

Ethylene and chloro-, fluoro- and cyano-derivatives of alkylene, such as ethylene, vinylchloride, vinylidene-chloride, vinylfluoride, vinylidene fluoride, tetrafluoroethylene, trifluorochloroethylene, hexafluoropropylene;

Acrylate and methacrylate monomers, such as acrylate, methacrylate, ethyl acrylate, propyl acrylate, isopropyl acrylate, n-, sec-,t-butyl acrylate, 3-methyl-1-pentyl acrylate, octyl acrylate, tetradecyl acrylate, 2-ethylhexyl acrylate, and phenyl acrylate; methyl methacrylate, n-propyl methacrylate, n-,sec-,t-butyl methacrylate, 2-ethylhexyl methacrylate, 2-methyl cyclohexyl methacrylate, monofluoroethyl methacrylate, beta-bromoethyl methacrylate, o-cresyl methacrylate, beta-naphthyl methacrylate, acrylic acid, methacrylic acid, Alpha-halogen acrylates, such as methyl chloro acrylate, methyl bromo acrylate, ethyl chloro acrylate, s-butyl chloro acrylate, cyclohexyl chloro acrylate, phenyl chloro acrylate, cyclohexyl bromo acrylate, n-propyl chloro acrylate, isopropyl chloro acrylate, n-butylchloro acrylate, and methyl fluoro acrylate;

Dienes particularly 1,3-butadiene, Isoprene, and chloroprene, 2-fluoro-butadiene, 1,1,3-tri-fluorobutadiene, 1,1,2,3-tetrafluoro butadiene, 1,1,2-trifluoro-3,4-dichlorobutadiene and tri- and pentafluoro butadiene and isoprene; and the like.

Preferred monomers include alkyl(meth)acrylate units and/or (meth)acrylic acid and/or other vinylic compounds capable of forming polymerisable radicals (e.g. styrene, n-propyl meth-acrylate, 2-methyl cyclohexyl methacrylate, tert-butyl acrylate, iso-butyl methacrylate, iso-butyl acrylate, o-cresyl methacrylate, t-butyl methacrylate, n-butyl acrylate, n-butyl meth-acrylate, methyl methacrylate, ethyl acrylate, propyl acrylate, iso-propyl methacrylate, 3-methyl-1-pentyl acrylate, octyl acrylate, tetradecyl acrylate, s-butyl acrylate, s-butyl methacrylate, 2-ethylhexyl acrylate, 2-ethylhexyl methacrylate, 2-methoxyethyl acrylate, phenyl acrylate, acrylic acid, methacrylic acid; 1,3-butadiene, isoprene, p-methylstyrene, 3,4-dimethyl styrene, m-ethyl styrene, p-butyl styrene, o-methoxy styrene, p-methoxystyrene, 2,6-dimethoxy styrene, vinyl acetate, vinyl methoxyacetate, vinyl isobutyrate, vinyl oleate, vinyl benzoate, vinyloctylphthalate.

Non-limiting examples of hydroxy- or alkoxyalkyl(meth)acrylates (Group C) are: 2-hydroxyethyl acrylate, 2-hydroxyethyl methacrylate, 2-hydroxypropyl acrylate, 2-hydroxypropyl methacrylate, 2-hydroxy-n-butyl acrylate and 2-hydroxy-n-butyl methacrylate and their corresponding methyl-, ethyl-, propyl- and butyl ethers or acetates.

Non-limiting examples of (poly)alkyleneglycolmono(meth)acrylates (Group D) are diethylene glycol monoacrylate, diethylene glycol monomethacrylate, triethylene glycol monoacrylate, triethylene glycol monomethacrylate, pentaethylene glycol monoacrylate, pentaethylene glycol monomethacrylate, dipropylene glycol monoacrylate, dipropylene glycol monomethacrylate, tripropylene glycol monoacrylate, tripropylene glycol monomethacrylate, pentapropylene glycol monoacrylate and pentapropylene glycol monomethacrylate; and their corresponding methyl-, ethyl-, propyl- and butylethers or acetates.

$C_1$-$C_4$ alkylethers of (poly)alkyleneglycolmono(meth)acrylates such as methoxypolyethylene-glycolmethacrylate and the like.

Use

The water-borne emulsion polymer can be used as a dispersing agent in aqueous systems, especially for organic or inorganic pigments in an aqueous medium; for water-borne decorative paints or water-borne coatings such as clear coatings or satin coatings or to produce Resin Free Pigment Concentrates (RFPC) for ultra low VOC (volable organic component) coatings.

Thus, it is a further object of the invention to provide a pigment dispersion comprising at least one inorganic or organic pigment and an emulsion polymer as described above.

Thus, the present invention also relates to a pigment dispersion comprising at least one organic and/or inorganic pigment; water and/or a mixture of water and water miscible solvents and an emulsion polymer as defined above.

Suitable dispersible organic pigments are selected from the azo pigment group consisting of mono azo-, disazo-, naphthol-, benzimid-azolones-, azocondensation-, metal complex-, isoindolinone- and isoindoline-pigments, indigo, chinophthalon-pigments, dioxazine-pigments, as well as polycyclic pigments such as quinacridones, phthalocyanines, perylenes, perinones, and thioindigo, further, anthraquinone pigments such as aminoanthraquinones, hydroxyanthraquinones, anthrapyrimidines, indanthrones, flavanthrones, pyranthrones, anthanthrones, and isoviolanthrones, and diketopyrrolopyrrole-pigments and the like. Further examples of organic pigments can be found in the monograph: W. Herbst, K. Hunger "*Industrielle organische Pigmente*" 2*nd* Edition, 1995, *VCH Verlagsgesellschaft, ISBN:* 3-527-28744-2.

Suitable dispersible inorganic pigments are, for example, carbon black, titanium dioxide, ferrous oxides, alumino silicates.

Water-miscible solvents are, for example, $C_1$-$C_4$alkohols, e.g. methanol, ethanol or iso-propanol; polyols e.g. glycerol or ethylene or propylene glycols, their dimers, trimers or polymers and their corresponding $C_1$-$C_4$ alkylethers.

The water-borne emulsion polymer according to the invention may very suitably be used in a dispersion, comprising 0-85 wt %, preferably 3 to 75 wt % of pigment and/or extenders such as calcium carbonate, barium sulphate, silicium dioxide, aluminum trihydroxide, organic fibres or glass.

The water-borne emulsion polymer can be added as dispersant in amounts of 0.1 to 200 wt % of solid dispersant to the pigment. The good activity of the polymer compound according to the invention is obtained at concentrations of 0.5 to 20 wt % of solid dispersant to inorganic pigment and 10 to 100 wt % of solid dispersant to organic pigment.

The dispersants can also be used in the form of salts, which are obtained by neutralization of the polymer with organic acids. Alternatively the polymer can be quaternized with alkylating agents such as benzylbromide, benzylchloride, methyliodide, dimethylsulfate, diethylsulfate and the like.

The emulsion polymer of the invention can be used alone or in combination with another dispersant and/or a common additive.

Non-limiting examples of dispersants are commercially available dispersants sold under the trade name SOLSPERSE 5000 and 22000 from Avecia, Inc. of Wilmington or EFKA-6745, EFKA-6746 and EFKA-6750, produced by EFKA Additives B.V.

High molecular weight dispersants are, for example, dispersants based on polyurethane such as EFKA-4520® or modified polyacrylates, such as EFKA-4500®, produced by EFKA Additives B.V.

Low molecular weight dispersants are, for example, dispersants based on polyethylene glycol monoalkylether such as polyethylene glycol monoC1-C20alkylether monomaleate or based on fatty acid modified polyesters such as EFKA-6220® produced by EFKA Additives B.V. Preferred are dispersants based on polyethylene glycol monoalkylether.

Further common additives may be present such as surfactants, defoamers, preservatives, anionic type wetting agents such as EFKA-6230® and EFKA-8510®, cationic wetting agents such as EFKA-5071®, leveling agents such as EFKA-3030®, EFKA-3034® and EFKA-3035®, anti cratering agents such as EFKA-3570® and EFKA-358® and coalescing solvents such as glycols, glycolethers and the like.

Suitable surfactants which may be used include ionic and nonionic surfactants. Typical examples are:

Alkyl polyglycol ethers such as, for example, ethoxylation products of lauryl, tridecyl, oleyl, and stearyl alcohols;

Alkyl phenol polyglycol ethers such as, for example, ethoxylation products of octyl- or nonylphenol, diisopropyl phenol, triisopropyl phenol;

Alkali metal or ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tri-tert-butyl phenol and penta- and octa-glycol sulfonates, Sulfosuccinate salts such as, for example, disodium ethoxylated nonylphenol half ester of sulfosuccinic acid, disodium n-octyldecyl sulfosuccinate, sodium dioctyl sulfosuccinate, and the like.

Defoamers which may be utilized include, for example, EFKA-2550, EFKA 2526 and EFKA-2527 produced by EFKA Additives B.V.

Preservatives which may be utilized include Metatin K521 produced by Rohm & Haas or biocides such as Parmetol A 28S produced by Schulke and Mayr GmbH.

Further common additives are mono,-di or trimeric fatty acids, succinic acid (mono) esters and inorganic acid such as HCl.

Preparation of the Emulsion Polymer

The water-borne emulsion polymer is prepared using known polymerization methods as described, for example, in the patent publication DE 19 12 483 or U.S. Pat. No. 4,170,582.

A suitable process for preparing a water-borne emulsion polymer as described above comprises the steps of:

(i) mixing the monomers (A), (B), (C), (D) and an initiator (E); or mixing the monomers (A), (B), (C), (D), water and an Initiator (E) to establish a premix;

(ii) adding the premix into water containing an Initiator (E), (iii) polymerizing the premix to obtain the emulsion polymer.

The polymerization time depends on the temperature and the desired final product properties but is preferably within the range of from 0.5 to 10 hours at temperatures at a range from 25° C. and 150° C., more preferably between 70° C. and 90° C.

As radical polymerization initiators the usual free radical initiators can be used. Examples are oil-soluble and water soluble initiators such as azobisisobutyronitrile, 2,2'-azobis [2(2-imidazolin-2-yl)propane]dihydrochloride, potassium persulfate, sodium persulfate, ammonium persulfate, tert-butyl peroxymaleic acid, succinic acid peroxide, and tert-butyl hydroperoxide, benzoylperoxide, di-tert-butylperoxide, tert-butylperoxybenzoate, tert-butylperoxy-2-ethyl-hexanoate and the like.

The initiator is present in step (i) and in step (ii) of the above process. The suitable amount of polymerization initiator in step (i) is from 0.1 to about 5% by weight on the basis of the total amount of the monomers used.

The dispersion preferably contains a surfactant, that may be included in the premix phase or water phase or both phases. Preferably, the surfactant is combined with the monomers in the premix phase. The suitable amount of surfactant is from 0.1% to about 2% by weight percentage on the basis of the total amount of the monomers used.

Thus, the above process comprises the steps of
(i) mixing the monomers (A), (B), (C), (D), water, an initiator (E) and a surfactant (F) to establish a premix;
(ii) adding the premix into water containing an initiator (E) and a surfactant (F),
(iii) polymerizing the premix to the emulsion polymer.

It is also possible to adjust the molecular weight of the resulting polymer by adding to the premix such a compound as ally alcohol, α-methyl styrene dimer, n-octylmercaptane, n-dodecylmercaptane, thloglycol acid, iso-octylmercaptopropionate, butylmercaptopropionate and the like. The suitable amount of chain transfer agent is from 0.1% to about 8% by weight percentage on the basis of the total amount of the monomers used.

Thus, the above process comprises the steps of
(i) mixing the monomers (A), (B), (C), (D), water, an initiator (E), a surfactant (F) and a chain transfer agent (G) to establish a premix;
(ii) adding the premix into water containing an initiator (E) and a surfactant (F)
(iii) polymerizing the premix to the emulsion polymer.

Advantages

The new emulsion polymer offers the following advantages:
   Low viscosity and good storage stability of Resin Free Pigment Concentrates
   High pigment loading is possible (40-75% depending on the type of pigment)
   Uniform color development in various water-borne decorative paints and water-borne clear coatings
   High gloss of the cured films
   Excellent compatibility with all kinds of water-borne paints and coatings. Typical examples of which are alkyd-emulsions, acrylic copolymer emulsions and polyurethane dispersions.
   advantageous anti-flooding behaviour
   outstanding humidity resistance.

The pigment concentrates show no viscosity increase after a storage of several weeks at elevated temperatures, give no settling with inorganic pigments in the aqueous medium and have much higher colour development for organic and inorganic pigments compared to known commercially available dispersing agents for the aqueous medium.

EXAMPLES

Example 1

Water (383.1 g) and sodium dodecylbenzene sulfonate (0.012 g, 0.012% of the total formulation) are placed in a three-necked flask under a nitrogen atmosphere and heated to 80° C. At 80° C. a solution consisting of 2,2'-Azobis[2(2-imidazolin-2-yl)propane]dihydro-chloride (3.6 g, 0.0111 mol) and water (20.0 g) is added to the reactor. After 5 minutes the continuous stirred premix consisting of styrene (132.2 g, 1.269 mol), hydroxyethylmethacrylate (54.1 g, 0.416 mol), dimethylaminoethyl methacrylate (56.0 g, 0.356 mol), methoxypolyethyleneglycol methacrylate (50% solution in water)*(315.1 g, 0.1459 mol), sodium dodecylbenzene sulfonate (0.06 g, 0.06% of the total formulation), iso-octylmercapto-propionate (19.7 g, 0.090 mol), 2,2'-Azobis[2(2-imidazolin-2-yl)propane]dlhydrochloride (10.90 g, 0.0337 mol) is added during 120 minutes. After addition of the premix, the contents of the flask are stirred for another 120 minutes at 80° C. The product is a white-yellowish, semi translucent liquid. The measured molecular weight (Mw, GPC, THF, 10% solution) of the prepared polymer is approximately 7000 g/mol.

*=commercial name Bisomer S10W, Laporte Performance Chemicals

Analytical Data

| Appearance | Opalescent liquid |
|---|---|
| Solid content | 43% |
| Amine value | 22 mg KOH/g |
| Density at 20° C. | 1.05 g · cm$^{-3}$ |
| Viscosity | 200 mPa · s |

In the following examples a similar polymerization procedure is followed:

Example 2

| Chemical Name | % |
|---|---|
| Dimethylaminoethyl methacrylate | 5.60 |
| Hydroxyethyl methacrylate | 5.41 |
| Styrene | 13.22 |
| Methoxypolyethyleneglycol methacrylate (50% in water)* | 31.51 |
| Isooctyl 3-mercaptopropionate | 1.97 |
| Demineralized Water | 40.753 |
| 2,2'-Azobis[2(2-imidazolin-2-yl)propane]dihydrochloride | 1.465 |
| sodium dodecylbenzenesulphonate | 0.072 |

Example 3

| Chemical Name | % |
|---|---|
| Vinylimidazole | 4.94 |
| Hydroxyethyl acrylate | 4.76 |
| MMA (methylmethacrylate) | 12.37 |
| Methoxypolyethyleneglycol methacrylate (50% in water)* | 28.74 |
| Dodecylmercaptane | 0.47 |
| Demineralized Water | 46.668 |
| 2,2'-Azobis[2(2-imidazolin-2-yl)propane]dihydrochloride | 1.98 |
| Sodium dodecylbenzenesulphonate | 0.072 |

Example 4

| Chemical Name | % |
|---|---|
| Dimethylaminoethyl acrylate | 5.60 |
| Hydroxyethyl methacrylate | 5.41 |
| Styrene | 13.22 |
| Methoxypolyethyleneglycol methacrylate (50% in water)* | 31.51 |
| Isooctyl 3-mercaptopropionate | 1.97 |

-continued

| Chemical Name | % |
|---|---|
| Demineralized Water | 40.753 |
| 2,2'-Azobis[2(2-imidazolin-2-yl)propane]dihydrochloride | 1.465 |
| Dodecylbenzenesulphonic acid, sodium salt (SDBS) | 0.072 |

*= commercial name Bisomer S7W, Laporte Performance Chemicals

Example 5

| Chemical Name | % |
|---|---|
| 1-Vinylimidazole | 3.36 |
| Hydroxyethyl acrylate | 5.82 |
| Styrene | 14.03 |
| Methoxypolyethyleneglycol methacrylate** | 16.80 |
| Isooctyl 3-mercaptopropionate | 2.70 |
| Demi Water | 53.218 |
| 2,2'-Azobis[2(2-imidazolin-2-yl)propane]dihydrochloride | 4.00 |
| Dodecylbenzenesulphonic acid, sodium salt (SDBS) | 0.072 |

**= commercial name Bisomer MPEG 550 MA, Laporte Performance Chemicals

Example 6

| Chemical Name | % |
|---|---|
| 2-Vinylpyridine | 5.60 |
| Hydroxyethyl methacrylate | 5.41 |
| Styrene | 13.22 |
| Methoxypolyethyleneglycol methacrylate (50% in water)* | 31.51 |
| Isooctyl 3-mercaptopropionate | 1.97 |
| Demi Water | 40.753 |
| 2,2'-Azobis[2(2-imidazolin-2-yl)propane]dihydrochloride | 1.465 |
| Dodecylbenzenesulphonic acid, sodium salt (SDBS) | 0.072 |

*= commercial name Bisomer S10W, Laporte Performance Chemicals

Example 7

| Chemical Name | % |
|---|---|
| Dimethylaminoethyl methacrylate | 5.60 |
| Hydroxyethyl acrylate | 5.16 |
| Styrene | 12.44 |
| Methoxypolyethyleneglycol methacrylate** | 16.80 |
| Isooctyl 3-mercaptopropionate | 2.47 |
| Demi Water | 53.808 |
| 2,2'-Azobis[2(2-imidazolin-2-yl)propane]dihydrochloride | 3.65 |
| Dodecylbenzenesulphonic acid, sodium salt (SDBS) | 0.072 |

**= commercial name Bisomer MPEG 550 MA, Laporte Performance Chemicals

Application Examples

A1 Organic Pigment Concentrate

A Resin Free Organic Pigment Concentrate based on the new water-borne emulsion polymer and Heliogen Blue L 7080 is prepared according to the following Table. 1

| | Comparative wt % | Inventive 1 wt % | Inventive 2 wt % |
|---|---|---|---|
| Emulsion polymer Example 1 | 0.00 | 25.00 | 0.00 |
| Emulsion polymer Example 5 | 0.00 | 0.00 | 25.00 |

-continued

| | Comparative wt % | Inventive 1 wt % | Inventive 2 wt % |
|---|---|---|---|
| Comparative (EFKA 4550) | 25.00 | 0.00 | 0.00 |
| EFKA 2550 (Defoamer) | 0.30 | 0.30 | 0.30 |
| Demineralized water | 31.60 | 31.60 | 31.60 |
| Preservative | 0.10 | 0.10 | 0.10 |
| Heliogen Blue L 7080 (Pigment) | 43.00 | 43.00 | 43.0 |
| Total | 100.00 | 100.00 | 100.00 |

EFKA 4550 is a high molecular weight polyacrylic dispersant as described in EP 311157. The product is commercially available. It is not an emulsion polymer.

The organic pigment concentrate of Tab. 1 is ground for 2 hours with two parts by weight of glass beads (2-3 mm) in a Scandex shaking equipment up to a particle size of <5 μm.

Stability of the organic pigment concentrate at 40° C.

| | Comparative | Inventive 1 | Inventive 2 |
|---|---|---|---|
| 1 week | + | ++ | ++ |
| 2 weeks | 0 | + | + |
| 3 weeks | 0 | + | + |
| 4 weeks | 0 | 0 | 0 |

+ = good no settlement, no separation
0 = reasonable settlement, sligthly seperated Viscosity stability of the organic pigment concentrate at 40° C. measured with Bohlin Rheometer PP40 (layer thickness 150 μm).

| | Comparative | Inventive 1 | Inventive 2 |
|---|---|---|---|
| Initial | 903 mPa · s | 192 mPa · s | 210 mPa · s |
| 4 weeks | 731 mPa · s | 241 mPa · s | 250 mPa · s |

Use of the Organic Pigment Concentrate

The compatibility of the organic pigment concentrates based on Heliogen Blue of Tab. 1 are tested at a level of 1.25% in a water-borne satin lacquer.

After homogenization the lacquer is applied with a 75 μm wire onto a polyester film (film thickness 75 μm). The film is dried in air for 24 hours.

| | color development |
|---|---|
| comparative | 0 |
| inventive 1 | + |
| inventive 2 | + |

+ = good
0 = reasonable

A2 Inorganic Pigment Concentrate

Preparation of an inorganic pigment concentrate based of Bayferrox Red 130 M

The inorganic pigment concentrate is prepared according to the following Table 2:

| | Comparative wt % | Inventive 3 wt % | Inventive 4 wt % |
|---|---|---|---|
| Comparative EFKA 4550 | 14.80 | 0.00 | 0.00 |
| Emulsion polymer Example 1 | 0.00 | 14.80 | 0.00 |

-continued

|  | Comparative wt % | Inventive 3 wt % | Inventive 4 wt % |
|---|---|---|---|
| Emulsion polymer Example 5 | 0.00 | 0.00 | 14.80 |
| EFKA 2550 (Defoamer) | 0.30 | 0.30 | 0.30 |
| Optigel SH (Anti settling) | 0.30 | 0.30 | 0.30 |
| Demineralized water | 17.50 | 17.50 | 17.50 |
| Preservative | 0.10 | 0.10 | 0.10 |
| Bayferrox 130 M (Pigment) | 67.00 | 67.00 | 67.00 |
| Total | 100.00 | 100.00 | 100.00 |

The Inorganic pigment concentrate is ground for 2 hours with two parts by weight of glass beads (2-3 mm) to a particle size of <5 μm in the Scandex.

Stability of the inorganic pigment concentrate at 40° C.

|  | Comparative | Inventive 3 | Inventive 4 |
|---|---|---|---|
| 1 week | + | ++ | ++ |
| 2 weeks | + | + | + |
| 3 weeks | 0 | + | 0 |
| 4 weeks | − | 0 | 0 |

+ = good no settlement, no separation
0 = reasonable settlement, sligthly separated
− = bad a lot of settlement, separated Viscosity stability of the inorganic pigment concentrate at 40° C. measured with Bohlin Rheometer PP40 (layer thickness 150 μm).

|  | Comparative | Inventive 3 | Inventive 4 |
|---|---|---|---|
| Initial | 867 mPa · s | 192 mPa · s | 210 mPa · s |
| 4 weeks | 1057 mPa · s | 241 mPa · s | 250 mPa · s |
| separation | yes | no | no |

Use of the Inorganic Pigment Concentrate

The concentrates based on Bayferrox Red are tested at a level of 2.5 wt % in a satin lacquer (20 wt % titanium dioxide). After homogenization the lacquer is applied with a 75 μm wire onto a polyester film (film thickness 75 μm). The film is dried in air for 24 hours.

|  | color development |
|---|---|
| comparative | 0 |
| inventive 3 | + |
| inventive 4 | + |

+ = good
0 = reasonable

Humidity Test:

To further evaluate the color development, compatibility and humidity resistance industrial paints are produced with two pigment concentrates (one containing 43% of Heliogen Blue (Tab. 1a) and another containing 75% of titanium dioxide (Tab. 3). These paints are based on the following water-borne clear resin systems 2 pack polyurethane stoving enamel pure acrylic dispersion TABLE 1a

|  | Comparative wt % | Inventive 1 wt % | Inventive 2 wt % |
|---|---|---|---|
| Emulsion polymer Example 1 | 0.00 | 22.50 | 0.00 |
| Emulsion polymer Example 5 | 0.00 | 0.00 | 22.50 |
| Comparative (EFKA 4550) | 22.50 | 0.00 | 0.00 |
| common dispersant | 2.50 | 2.50 | 2.50 |
| EFKA 2550 (Defoamer) | 0.30 | 0.30 | 0.30 |
| Demineralized water | 31.60 | 31.60 | 31.60 |
| Preservative | 0.10 | 0.10 | 0.10 |
| Heliogen Blue L 7080 (Pigment) | 43.00 | 43.00 | 43.0 |
| Total | 100.00 | 100.00 | 100.00 |

TABLE 3

|  | Comparative wt % | Inventive wt % |
|---|---|---|
| Comparative EFKA 4550 | 10.70 | 0.00 |
| Emulsion polymer Example 1 | 0.00 | 10.70 |
| common dispersant | 1.10 | 1.10 |
| EFKA 2550 (Defoamer) | 0.30 | 0.30 |
| Optigel SH (Anti settling) | 0.20 | 0.20 |
| Demineralized water | 12.50 | 12.50 |
| Preservative | 0.20 | 0.20 |
| Kronos 2310 (Pigment) | 75.00 | 75.00 |
| Total | 100.00 | 100.00 |

The detailed formulations are shown below.

Water-Borne 2 Pack Polyurethane:

56.80 wt % Bayhydrol VP LS 2235 (45%) (polyurethane)

11.46 wt % white concentrate of Tab. 3 containing an emulsion polymer according to Ex. 1

2.86 wt % blue concentrate of Tab. 1a containing an emulsion polymer according to Ex. 1

17.4 wt % Bayhydur VP LS 2319(100%)

11.48% demineralized water.

Water-Borne Stoving Enamel:

43.13 wt % Uradil SZ255 G3Z (65%) (DSM-resin)

7.00 wt % Cymel 303 (hexamethoxymethylmelamine, American Cyanamid)

9.34 wt % white concentrate of Tab. 3 containing an emulsion polymer according to Ex. 1

2.33 wt % blue concentrate of Tab. 1a containing an emulsion polymer according to Ex. 1

0.35 wt % EFKA-3580 (leveling additive)

0.10 wt % EFKA-2526 (defoamer)

37.75 wt % demineralized water

Water-Borne Pure Acrylic Dispersion:

72.22 wt % Primal E-357 (47.5%) (copolymer of alkyl methacrylate or acrylate and methacrylic or acrylic acid, Rohm & Haas)

1.75 wt % Acrysol RM-8 (rheology modifier from Rohm & Haas)

0.12 wt % ammonia 7.46 wt % demineralized water 7.01 wt % butylglycol 3 containing an emulsion polymer according to Ex. 1

2.29 wt % blue concentrate of Tab. 1a containing an emulsion polymer according to Ex. 1

Humidity Resistance Tests are Carried Out as Follows:

For each resin system three films based on the individual dispersants are applied next to each other on one aluminum Q-panel (75 μm wire bar) and tested after 7 days of drying by exposure at 40° C. for 360 hours in a humidity/condensation cabinet.

Stoving enamels are cured for 20 min at 150° C.

The Table Below Shows the Results

| System | Inventive | comparative |
|---|---|---|
| Water-borne 2 pack polyurethane: | ++ | − |
| Water-borne stoving enamel | ++ | − |
| Water-borne pure acrylic dispersion | +/− | − |

++ = good,
− = bad,
+/− loss of adhesion

As comparative EFKA 4550 was added Instead of the emulsion polymer.

The results of the humidity test confirm that paint films based on the emulsion polymer according to the invention show a strong water resistance.

The invention claimed is:

1. A water-borne emulsion polymer consisting of as copolymerized units the following monomers:
   (A) an ethylenically unsaturated monomer containing at least one amino group;
   (B) styrene;
   (C) a hydroxy- or alkoxyalkyl(meth)acrylate of the formula $$CH_2=CH(R^1)-COO-C_tH_{2t}-OR^2$$

wherein $R^1$ is hydrogen or methyl and $R^2$ is hydrogen or $C_1$-$C_6$alkyl and t is an integer of 2, 3, 4, 5 or 6; and
   (D) a (poly)alkyleneglycolmono(meth)acrylate of the formula $$CH_2=CH(R^1)-COO-(C_mH_{2m}O)_n-OR^2$$

wherein $R^1$ is hydrogen or methyl and $R^2$ is hydrogen or $C_1$-$C_6$alkyl and m is an integer of 2 or 3 and n is an integer of 2 to 30.

2. An emulsion polymer according to claim 1, wherein monomer (A) is an amino(meth)acrylate, a vinylpyridine or a vinylimidazole.

3. An emulsion polymer according to claim 1, wherein monomer (A) is dimethylaminoethylmethacrylate, monomer (C) is hydroxyethylmethacrylate and monomer (D) is methoxypolyethyleneglycol methacrylate.

4. An emulsion polymer according to claim 1 comprising in addition another dispersant and/or a common additive.

5. An aqueous dispersion comprising the emulsion polymer according to claim 1.

6. A water-borne decorative paint, water-borne coating or Resin Free Pigment Concentrates (RFPC) for ultra low VOC coatings comprising the dispersion of claim 5.

7. A pigment dispersion comprising at least one organic and/or inorganic pigment; water and/or a mixture of water and a water miscible solvent and an emulsion polymer according to claim 1.

8. A process for preparing the water-borne emulsion polymer of claim 1, which process comprises the steps of:
   (i) mixing the monomers (A), (B), (C), (D) and an initiator (E); or mixing the monomers (A), (B), (C), (D), water and an initiator (E) to establish a premix;
   (ii) adding the premix into water containing an initiator (E),
   (iii) polymerizing the premix to the emulsion polymer.

9. A process for preparing the water-borne emulsion polymer of claim 1, which process comprises the steps of
   (i) mixing the monomers (A), (B), (C), (D), water, an initiator (E) and a surfactant (F) to establish a premix;
   (ii) adding the premix into water containing an initiator (E) and a surfactant (F),
   (iii) polymerizing the premix to the emulsion polymer; or the steps of
   (i) mixing the monomers (A), (B), (C), (D), water, an initiator (E), a surfactant (F) and a chain transfer agent (G) to establish a premix;
   (ii) adding the premix into water containing an initiator (E) and a surfactant (F)
   (iii) polymerizing the premix to the emulsion polymer.

10. A water-borne emulsion polymer consisting of as copolymerized units the following monomers:
    (A) an ethylenically unsaturated monomer containing at least one amino group;
    (B) styrene;
    (C) a hydroxy- or alkoxyalkyl(meth)acrylate of the formula $$CH_2=CH(R^1)-COO-C_tH_{2t}-OR^2$$

wherein $R^1$ is hydrogen or methyl and $R^2$ is hydrogen or $C_1$-$C_6$alkyl and t is an integer of 2, 3, 4, 5 or 6;
    (D) a (poly)alkyleneglycolmono(meth)acrylate of the formula $$CH_2=CH(R^1)-COO-(C_mH_{2m}O)_n-OR^2$$

wherein $R^1$ is hydrogen or methyl and $R^2$ is hydrogen or $C_1$-$C_6$alkyl and m is an integer of 2 or 3 and n is an integer of 2 to 30, and
    wherein the water-borne emulsion polymer is obtained by a process comprising the steps of:
    (i) mixing the monomers (A), (B), (C), (D) and an initiator (E); or mixing the monomers (A), (B), (C), (D), water and an initiator (E) to establish a premix;
    (ii) adding the premix into water containing an initiator (E),
    (iii) polymerizing the premix to the emulsion polymer.

11. An emulsion polymer according to claim 2 comprising in addition another dispersant and/or a common additive.

12. An emulsion polymer according to claim 3 comprising in addition another dispersant and/or a common additive.

13. A water-borne emulsion polymer consisting of as copolymerized units the following monomers:
    (A) an ethylenically unsaturated monomer containing at least one amino group;
    (B) styrene;
    (C) a hydroxy- or alkoxyalkyl(meth)acrylate of the formula $$CH_2=CH(R^1)-COO-C_tH_{2t}-OR^2$$

wherein $R^1$ is hydrogen or methyl and $R^2$ is hydrogen or $C_1$-$C_6$alkyl and t is an integer of 2, 3, 4, 5 or 6;
    (D) a (poly)alkyleneglycolmono(meth)acrylate of the formula $$CH_2=CH(R^1)-COO-(C_mH_{2m}O)_n-OR^2$$

wherein $R^1$ is hydrogen or methyl and $R^2$ is hydrogen or $C_1$-$C_6$alkyl and m is an integer of 2 or 3 and n is an integer of 2 to 30, and
    wherein the water-borne emulsion polymer is obtained by a process comprising the steps of:
    (i) mixing the monomers (A), (B), (C), (D), water, an initiator (E) and a surfactant (F) to establish a premix;
    (ii) adding the premix into water containing an initiator (E) and a surfactant (F),
    (iii) polymerizing the premix to the emulsion polymer; or the steps of
    (i) mixing the monomers (A), (B), (C), (D), water, an initiator (E), a surfactant (F) and a chain transfer agent (G) to establish a premix;

(ii) adding the premix into water containing an initiator (E) and a surfactant (F)

(iii) polymerizing the premix to the emulsion polymer.

14. A Resin Free Pigment Concentrates (RFPC) for ultra low VOC coatings composition consisting of:
- a dispersion which includes a water-borne emulsion polymer comprising as copolymerized units the following monomers:
- (A) dimethylaminoethylmethacrylate;
- (B) styrene;
- (C) hydroxyethylmethacrylate; and
- (D) methoxypolyethyleneglycol methacrylate.

15. The Resin Free Pigment Concentrates (RFPC) for ultra low VOC coatings composition of claim 14, wherein the dispersion further comprises another dispersant.

* * * * *